United States Patent
Tang et al.

(10) Patent No.: US 9,404,031 B2
(45) Date of Patent: Aug. 2, 2016

(54) COMPOSITIONS AND METHODS FOR CONTROLLING PARTICULATE MIGRATION IN A SUBTERRANEAN FORMATION

(71) Applicant: Halliburton Energy Services, Inc., Houston, TX (US)

(72) Inventors: Tingji Tang, Houston, TX (US); Feng Liang, Houston, TX (US); Loan Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 199 days.

(21) Appl. No.: 13/766,892

(22) Filed: Feb. 14, 2013

(65) Prior Publication Data
US 2014/0190700 A1    Jul. 10, 2014

Related U.S. Application Data

(60) Provisional application No. 61/750,077, filed on Jan. 8, 2013.

(51) Int. Cl.
| | |
|---|---|
| C09K 8/575 | (2006.01) |
| E21B 43/02 | (2006.01) |
| C09K 8/57 | (2006.01) |
| C09K 8/66 | (2006.01) |
| C09K 8/68 | (2006.01) |
| C09K 8/88 | (2006.01) |

(52) U.S. Cl.
CPC ............ *C09K 8/5751* (2013.01); *C09K 8/572* (2013.01); *C09K 8/665* (2013.01); *C09K 8/68* (2013.01); *C09K 8/88* (2013.01); *E21B 43/025* (2013.01)

(58) Field of Classification Search
CPC ...... E21B 43/26; C09K 8/572; C09K 8/5751; C09K 8/665
USPC ............ 166/307, 308.1, 308.6, 305.1, 280.2, 166/280.1
See application file for complete search history.

(56) References Cited

U.S. PATENT DOCUMENTS

| | | | |
|---|---|---|---|
| 4,042,031 A | 8/1977 | Knapp | |
| 5,775,425 A * | 7/1998 | Weaver et al. | 166/276 |
| 6,047,772 A | 4/2000 | Weaver et al. | |
| 7,063,151 B2 | 6/2006 | Nguyen et al. | |
| 7,134,497 B1 * | 11/2006 | Chatterji et al. | 166/308.6 |
| 7,392,847 B2 | 7/2008 | Gatlin et al. | |
| 7,398,825 B2 | 7/2008 | Nguyen et al. | |
| 7,493,957 B2 | 2/2009 | Nguyen et al. | |
| 7,571,767 B2 * | 8/2009 | Parker et al. | 166/280.2 |
| 7,581,593 B2 | 9/2009 | Pankratz et al. | |
| 7,730,950 B2 | 6/2010 | Nguyen et al. | |
| 7,766,099 B2 | 8/2010 | Nguyen | |
| 7,934,557 B2 | 5/2011 | Nguyen | |
| 7,956,017 B2 | 6/2011 | Gatlin et al. | |
| 8,105,986 B2 | 1/2012 | Zhang | |
| 2003/0234103 A1 | 12/2003 | Lee et al. | |
| 2006/0035790 A1 | 2/2006 | Okell et al. | |
| 2006/0124309 A1 * | 6/2006 | Nguyen et al. | 166/308.2 |
| 2006/0289162 A1 | 12/2006 | Santra et al. | |
| 2009/0095535 A1 * | 4/2009 | Nguyen | 175/72 |
| 2010/0069536 A1 * | 3/2010 | Sau | 524/48 |
| 2012/0220504 A1 | 8/2012 | Rickman et al. | |
| 2012/0279704 A1 * | 11/2012 | Eoff et al. | 166/280.2 |
| 2013/0274170 A1 * | 10/2013 | Yuan-Huffman et al. | 510/337 |
| 2015/0267520 A1 | 9/2015 | Liang et al. | |

FOREIGN PATENT DOCUMENTS

| | | |
|---|---|---|
| CA | 2772833 | 3/2010 |
| CA | 2833833 | 11/2012 |
| WO | 0194742 A1 | 12/2001 |
| WO | 2014109939 A1 | 7/2014 |
| WO | 2014110110 A1 | 7/2014 |
| WO | 2015105521 A1 | 7/2015 |

OTHER PUBLICATIONS

International Search Report and Written Opinion for PCT/US2014/010022 dated Apr. 23, 2014.
International Search Report and Written Opinion for PCT/US2014/010643 dated Apr. 23, 2014.
Nguyen et al., Water-Based, Frac-Pack Remedial Treatment Extends Well Life, SPE 144065, 2011.
International Search Report and Written Opinion for PCT/US2014/025411 dated Oct. 8, 2014.
Canadian Office Action for CA 2,890,033 dated Apr. 26, 2016.

* cited by examiner

*Primary Examiner* — Doug Hutton, Jr.
*Assistant Examiner* — Silvana Runyan
(74) *Attorney, Agent, or Firm* — McDermott Will & Emery LLP; Craig Roddy

(57) ABSTRACT

Stabilizers that include hydrophobically modified amine-containing polymers may be utilized as compositions or in methods for controlling particulate migration in a subterranean formation. For example, a method may include providing a treatment fluid that comprises a base fluid and a hydrophobically modified amine-containing polymer (HMAP), the HMAP comprising a plurality of hydrophobic modifications on an amine-containing polymer; introducing the treatment fluid into a wellbore penetrating a subterranean formation, the subterranean formation comprising a plurality of particulates; and allowing the HMAP to coat at least some of the particulates.

13 Claims, No Drawings

US 9,404,031 B2

COMPOSITIONS AND METHODS FOR CONTROLLING PARTICULATE MIGRATION IN A SUBTERRANEAN FORMATION

CROSS-REFERENCE TO RELATED APPLICATIONS

This application claims the benefit of U.S. Provisional Application No. 61/750,077, filed Jan. 8, 2013.

BACKGROUND

The present invention relates to methods and compositions for controlling particulate migration in a subterranean formation with stabilizers that include amine-containing polymers.

Hydrocarbon wells are often at least partially located in unconsolidated portions of a subterranean formation. As used herein, the term "unconsolidated portion of a subterranean formation" refers to a portion of a subterranean formation that comprises loose particulate matter (e.g., particulates of sandstones, carbonates, limestones, coal beds, shales, diatomites, chalks, and formation fines) that can migrate out of the formation with, among other things, the oil, gas, water, and/or other fluids recovered out of the well. The particulate material in a relatively unconsolidated portion of a subterranean formation may be readily entrained by recovered fluids, for example, those wherein the particulates in that portion of the subterranean formation are bonded together with insufficient bond strength to withstand the forces produced by the production of fluids through those regions of the formation. The presence of particulate matter, such as sand, in the recovered fluids is disadvantageous and undesirable in that the produced particulates may abrade pumping and other producing equipment and reduce the fluid production capabilities of certain portions of a subterranean formation.

One method used to mitigate the migration of particulates in subterranean formations involves adhering the particulates together in the area of interest, which is usually accomplished by treating the particulates with traditional tackifiers. As used herein the term "tackifier" generally refers to a chemical or polymer capable of forming a nonhardening coating on a surface of a particulate (e.g., formation fines, formation sand, proppant particulates, and gravel particulates). Generally, traditional tackifiers are sticky to the touch, which often cause the traditional tackifier and coated particulates to accumulate on surfaces of wellbore tools (e.g., pumps, pipes, sand screws, and the like). Further, in deviated wellbores, the accumulation of tacky particulates can be especially problematic because particulate settling is magnified across the wellbore radius as compared to along the wellbore length. The accumulation of particulates within the wellbore can cause the pressure in the wellbore to increase, which can lead to costly formation damage. In some instances, remediation of accumulated traditional tackifiers and coated particulates can involve significant time and cost.

SUMMARY OF THE INVENTION

The present invention relates to methods and compositions for controlling particulate migration in a subterranean formation with stabilizers that include hydrophobically modified amine-containing polymers.

In one embodiment, a method may include providing a treatment fluid that comprises a base fluid and a hydrophobically modified amine-containing polymer (HMAP), the HMAP comprising a plurality of hydrophobic modifications on an amine-containing polymer; introducing the treatment fluid into a wellbore penetrating a subterranean formation, the subterranean formation comprising a plurality of particulates; and allowing the HMAP to coat at least some of the particulates.

In another embodiment, a method may include mixing a treatment fluid that comprises a base fluid and a plurality of HMAP-coated particulates that comprise a particulate and an HMAP that coats at least a portion of the particulate, the HMAP comprising a plurality of hydrophobic modifications on an amine-containing polymer; and introducing the treatment fluid into a wellbore penetrating a subterranean formation.

In yet another embodiment, coated particulate may include a particulate; and an HMAP that coats at least a portion of the particulate, the HMAP comprising a plurality of hydrophobic modifications on an amine-containing polymer.

The features and advantages of the present invention will be readily apparent to those skilled in the art upon a reading of the description of the preferred embodiments that follows.

DETAILED DESCRIPTION

The present invention relates to methods and compositions for controlling particulate migration in a subterranean formation with stabilizers that include hydrophobically modified amine-containing polymers.

As used herein, the term "hydrophobically modified amine-containing polymer" (or "HMAP") is used to describe amine-containing polymers (i.e., polymers with an amine in the polymer backbone, polymer branch, or in both the backbone and branches) that have been hydrophobically modified. Generally, the HMAP, like traditional tackifiers, is nonhardening but is less sticky to the touch than traditional tackifiers while still being effective at agglomerating particulates. As a consequence, the treatment fluids comprising the HMAP or HMAP-coated particulates may advantageously stick to wellbore tools to a lesser degree than traditional tackifiers. Mitigating the accumulation of sticky substances and particulates on wellbore tools reduces the cost and use of chemicals associated with cleanup of traditional tackifiers.

As used herein, the term "coating," and the like, does not imply any particular degree of coating on a particulate. In particular, the terms "coat" or "coating" do not imply 100% coverage by the coating on a particulate. It should be understood that the term "particulate," as used in this disclosure, includes all known shapes of materials, including substantially spherical materials, fibrous materials, polygonal materials (such as cubic materials), and combinations thereof.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

As described above, the HMAP described herein are amine-containing polymers that have been hydrophobically modified. Examples of amine-containing polymers may include, but are not limited to, polyamines (e.g., spermidine and spermine), polyimines (e.g., poly(ethylene imine) and poly(propylene imine)), polyamides, poly(2-(N,N-dimethylamino)ethyl methacrylate), poly(2-(N,N-diethylamino)ethyl methacrylate), poly(vinyl imidazole), and the like, any copolymer thereof, and any combination thereof. Further, amine-containing polymers may include a copolymer of at least one of the foregoing amine-containing polymers (or corresponding monomer unit) and at least one polymer (or corresponding monomer unit) that does not contain an amine (e.g., polyethylene, polypropylene, polyethylene oxide, polypropylene oxide, polyvinylpyridine, polyacrylic acid, polyacrylate, polymethacrylate, and the like).

Hydrophobic modifications may, in some embodiments, include, but are not limited to, a $C_4$-$C_{30}$ characterized by at least one selected from the group consisting of a straight chain, a branched chain, comprising an unsaturated C—C bond, comprising an aryl group, and the like, and any combination thereof.

Formulas I-III provide examples of the HMAP described herein wherein Z is R or COR, and wherein R is a hydrophobic modification described herein, e.g., a $C_4$-$C_{30}$ characterized by at least one selected from the group consisting of a straight chain, a branched chain, comprising an unsaturated C—C bond, comprising an aryl group, and the like, and any combination thereof.

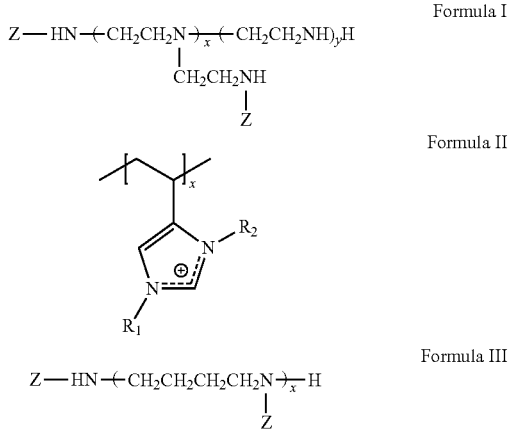

Formula I

Formula II

Formula III

In some embodiments, the HMAP may have a degree of modification such that the of amount hydrophobic modification ranges from a lower limit of about 0.1%, 1%, 10%, or 30% by molar ratio of amine content to an upper limit of about 99.9%, 95%, 70%, or 50% by molar ratio of amine content, and wherein the amount of hydrophobic modification may range from any lower limit to any upper limit and encompass any subset therebetween.

In some embodiments, the HMAP may have a molecular weight ranging from a lower limit of about 300 g/mol, 1,000 g/mo, 10,000 g/mol, or 100,000 g/mol to an upper limit of about 3,000,000 g/mol, 1,000,000 g/mol, or 100,000 g/mol, and wherein the molecular weight may range from any lower limit to any upper limit and encompass any subset therebetween.

In some embodiments, hydrophobic modifications may be achieved via a plurality of reaction schemes including, but not limited to, amidation with carboxy terminal compounds (e.g., fatty acids), quaternization by alkyl halides, addition reactions with alpha-olefins, nucleophilic attack with alkyl compounds having active groups (e.g., a terminal epoxide), and the like, and any combination thereof.

In some embodiments, the HMAP described herein may be present in a treatment fluid at a concentration ranging from a lower limit of about 0.01%, 0.05%, or 0.1% by weight of the base fluid to an upper limit of about 3%, 1%, or 0.5% by weight of the base fluid, wherein the concentration of the HMAP may range from any lower limit to any upper limit and encompass any range therebetween.

Some embodiments of the present invention may involve agglomerating particulates, e.g., formation fines, formation sand, proppants, and/or gravel particulates, with an HMAP described herein. Some embodiments may involve precoating particulates (e.g., gravel particulates and/or proppants) with the HMAP ("HMAP-coated particulates") before addition to the treatment fluid. In some instances, the HMAP-coated particulates may be produced by dry-coating or wet-coating methods.

In other embodiments, the particulates may be coated with the HMAP ("HMAP-coated particulates") while the particulates reside in or are being introduced into the subterranean formation. For example, some embodiments may involve contacting a plurality of particulates with a treatment fluid comprising HMAP described herein and allowing the HMAP to form a coating on the particulates. Some embodiments may involve adding the particulates (e.g., gravel particulates and/or proppants) to the treatment fluid before introduction into the wellbore. Additional embodiments may involve introducing a treatment fluid comprising the HMAP into the subterranean formation where the particulates (e.g., formation fines, formation sand, gravel particulates, and/or proppants) reside and allowing the HMAP to coat the particulates.

Some embodiments may involve introducing a treatment fluid comprising a low-viscosity base fluid (e.g., an aqueous-miscible fluid like isopropyl alcohol or a glycol ether) and HMAP into the subterranean formation, and then introducing a higher viscosity fluid (e.g., water or a brine) into the subterranean formation to push the treatment fluid with the HMAP deeper into the subterranean formation. In some embodiments, the treatment fluid may comprise particulates and/or HMAP-coated particulates. These methods may be used in combination with the foregoing methods.

In some embodiments, an optional coupling agent (e.g., a silane coupling agent or surfactant) may be used, among other things, to act as a mediator to help bond the HMAP and the particulates. Examples of suitable silane coupling agents include, but are not limited to, N-2-(aminoethyl)-3-aminopropyltrimethoxysilane, and 3-glycidoxypropyltrimethoxysilane, and combinations thereof. In some embodiments, the coupling agent may be present in a treatment fluid at a concentration ranging from a lower limit of about 0.001%, 0.05%, or 0.1% by weight of the HMAP to an upper limit of about 3%, 1%, or 0.5% by weight of the HMAP, wherein the concentration of the silane coupling agent may range from any lower limit to any upper limit and encompass any range therebetween.

In some embodiments, the particulates or HMAP-coated particulates may be present in a treatment fluid at a concentration ranging from a lower limit of about 0.1 pounds per gallon ("ppg"), 1 ppg, or 5 ppg to an upper limit of about 30 ppg, 20 ppg, or 10 ppg by volume of the treatment fluid, wherein the concentration of the particulates or HMAP-coated particulates may range from any lower limit to any upper limit and encompass any range therebetween.

Some embodiments may involve using HMAP described herein and/or HMAP-coated particulates in fracturing operations, which may involve (1) optionally introducing a prepad fluid into the subterranean formation, (2) introducing a pad fluid into the subterranean formation to initiate and create at least one fracture, (3) introducing a proppant slurry into the subterranean formation so as to place the proppant into the fracture, and (4) optionally introducing a flush fluid into the subterranean formation. Prepad fluids are generally introduced at or below matrix pressure and before pad fluids. Pad fluids are generally introduced above matrix pressure (i.e., at a pressure sufficient to create or extend at least one fracture in the subterranean formation). In some embodiments, at least one of the prepad fluid, pad fluid, and flush fluid may comprise the HMAP's described herein. In some embodiments, proppant slurries may comprise at least one of proppant, proppant in combination with an HMAP, HMAP-coated proppant, or HMAP-coated proppant in combination with HMAP.

By way of nonlimiting example, a fracturing operation may involve introducing a prepad fluid comprising HMAP described herein, introducing a pad fluid at a pressure sufficient to create or extend at least one fracture in the subterranean formation and optionally comprising HMAP described herein, and introducing a proppant slurry comprising proppant and optionally an HMAP. In another example, the proppant slurry may comprise HMAP-coated proppant. In another example, the prepad fluid may comprise other additives, e.g., clay stabilizing agents, and no HMAP or traditional tackifier. In another example, the prepad and pad fluids may comprise no tackifier, and the proppant slurry may comprise proppant and HMAP or HMAP-coated proppant optionally with an HMAP. In yet another example, the prepad fluid, pad fluid, and proppant slurry may each comprise no HMAP and the flush fluid comprise an HMAP described herein.

Some embodiments may involve using HMAP described herein in post-acidizing operations. For example, some embodiments may involve introducing an acidizing fluid into a wellbore penetrating a subterranean formation, then introducing a treatment fluid comprising a base fluid and an HMAP, and allowing the HMAP to at least partially coat particulates in the subterranean formation.

Some embodiments may involve using HMAP described herein in gravel packing operations. In some instances, gravel packing operations may involve forming a gravel pack in a wellbore with a treatment fluid that comprises at least one of gravel particulates in combination with an HMAP, HMAP-coated gravel particulates, or HMAP-coated gravel particulates in combination with HMAP. In other instances, gravel-packing operations may involve forming a gravel pack in a wellbore, then treating the gravel pack with a treatment fluid comprising an HMAP described herein.

Some embodiments may involve using HMAP described herein in remedial operations, which may involve introducing a treatment fluid into the subterranean formation, the treatment fluid comprising HMAP described herein. For example, during a wellbore operation if formation fines or other particulates are being produced, the remedial operation may be performed to agglomerate the particulates and reduce or eliminate particulate production.

It should be noted that when HMAP described herein are used in an operation in more than one treatment fluid, whether free or as a coating, the composition and/or concentration of the HMAP in the various treatment fluids may independently be the same or different.

The methods and compositions described herein may be used in full-scale operations or pills. As used herein, a "pill" is a type of relatively small volume of specially prepared treatment fluid placed or circulated in the wellbore.

Some embodiments of the present invention may involve producing hydrocarbon fluids from the portion of the subterranean formation having been treated with the HMAP and/or HMAP-coated particulates described herein.

Base fluids suitable for use in conjunction with the present may include aqueous fluids, aqueous-miscible fluids, and any combination thereof.

Aqueous fluids suitable for use in conjunction with the present invention may comprise fresh water, saltwater (e.g., water containing one or more salts dissolved therein), brine (e.g., saturated salt water or produced water), seawater, produced water (e.g., water produced from a subterranean formation), aqueous-miscible fluids, and any combination thereof. Generally, the water may be from any source, provided that it does not contain components that might adversely affect the stability and/or performance of the first treatment fluids or second treatment fluids of the present invention.

Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous fluid, and any combination thereof.

In certain embodiments, the density of the base fluid can be adjusted, among other purposes, to provide additional particulate transport and suspension in the treatment fluids used in the methods of the present invention. In certain embodiments, the pH of the base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

In some embodiments, the base fluid may be foamed. In some embodiments a treatment fluid for use in conjunction with the present invention may comprise a base fluid, a gas, a foaming agent, and at least one of particulates, particulates in combination with HMAP, HMAP-coated particulates, or HMAP-coated particulates in combination with HMAP.

In some embodiments, the gas is selected from the group consisting of nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the present invention may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

Suitable proppants for use in conjunction with the present invention may be any material suitable for use in subterranean operations. Examples of these particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. Moreover, fibrous materials, that may or may not be used to bear the pressure of a closed fracture, may be included in certain embodiments of the present invention.

In some embodiments, treatment fluids described herein may further comprise additives. Suitable additives may include, but are not limited to, salts, weighting agents, inert solids, fluid loss control agents, emulsifiers, dispersion aids, corrosion inhibitors, emulsion thinners, emulsion thickeners, viscosifying agents, gelling agents, surfactants, particulates, proppants, gravel particulates, lost circulation materials, pH control additives, breakers, biocides, crosslinkers, stabilizers, chelating agents, scale inhibitors, gas hydrate inhibitors, mutual solvents, oxidizers, reducers, friction reducers, clay stabilizing agents, or any combination thereof. One skilled in the art with the benefit of this disclosure should understand the appropriate additives and concentrations thereof for use in conjunction with the present invention to achieve the desired result and so as to maintain operability of the methods of the present invention.

To facilitate a better understanding of the present invention, the following examples of preferred embodiments are given. In no way should the following examples be read to limit, or to define, the scope of the invention.

EXAMPLES

Example 1

A sand column was prepared to mimic a gravel pack in a wellbore. The column had three layers: (1) 66 g of 20/40 Brady sand, (2) 22 g of Brazos River sand (with particle size smaller than 200 mesh to simulate formation fines) mixed with 44 g of 20/40 Brady sand, and (3) 66 g of 20/40 Brady sand. The sand in each of the three layers was dry-coated with 1.5 wt % of hydrophobically modified polyethyleneimine (40% activate) before being packed into the column. The column was then heated to 180° F. and flushed with 200 mL of 5% KCl (approximately 2 pore volumes) from layer (1) through to layer (3). Then water was flowed through the column from the opposite direction, i.e., from layer (3) through to layer (1), to simulate wellbore production. The flow rate was started at 50 mL/min and increased to 100 mL/min then 150 mL/min. Effluents were collected at each flow rate where little to no Brazos River sand was observed in the effluents. When conducting a control experiment where the sand in each layer had not been coated/treated with the hydrophobically modified polyethyleneimine, Brazos River sand was observed in the effluents at each of the flow rates.

Example 2

Another sand column was tested that included three layers: (1) 66 g of 20/40 Brady sand dry-coated with 3 wt % of hydrophobically modified polyethyleneimine (40% activate), (2) 11 g of Brazos River sand and 11 g of coal fines mixed with 44 g of 20/40 Brady sand (not treated), and (3) 66 g of 20/40 Brady sand (not treated). Effluents were collected at flow rates of 50 mL/min, 100 mL/min, 150 mL/min, and 200 mL/min. The effluents at 50 mL/min, 100 mL/min were grey and cloudy indicating that some of the coal fines were able to migrate through the simulated gravel pack, i.e., layer (1). However, the amount of coal fines observed is significantly less than the 11 g in the column, thereby demonstrating control of particulate migration. At the higher two flow rates little to no coal fines and Brazos River sand were observed in the effluents. This example demonstrates that hydrophobically modified polyethyleneimine can control the migration of formation fines at all flow rates just by treating the gravel pack alone.

Example 3

Another sand column was tested that included three layers: (1) 66 g of 20/40 Brady sand (not treated), (2) 22 g of Brazos River sand mixed with 44 g of 20/40 Brady sand (not treated), and (3) 66 g of 20/40 Brady sand (not treated). In a procedure similar to Example 1, the column was flushed with KCl. However, then the column was flushed with 200 mL of 3 wt % of hydrophobically modified polyethyleneimine (40% activate) in isopropyl alcohol solution. Then, water was flowed in the opposite direction as described in Example 1. Effluents were collected at flow rates of 50 mL/min, 100 mL/min, 150 mL/min, and 200 mL/min, where little to no Brazos River sand was observed in the effluents. This indicates the effectiveness of the remedial treatment of HMAP for the formation.

Example 4

Another sand column was prepared that included three layers: (1) 66 g of 20/40 Brady sand (not treated), (2) 22 g of WAC-9™ (a fluid loss control additive, available from Halliburton Energy Services, Inc.), which has a particle size of 325 mesh, mixed with 44 g of 20/40 Brady sand (not treated), and (3) 66 g of 20/40 Brady sand (not treated). The procedure of Example 3 was followed with effluents collected at 50 mL/min, 100 mL/min, 150 mL/min, and 200 mL/min. Each of the effluents were cloudy but with a total mass of WAC-9™ much less than what was originally placed in the column, thereby indicating some control of particulate migration. Without being limited by theory, it is believed that a higher concentration or thicker coating of hydrophobically modified polyethyleneimine may be needed for complete particulate migration control when working with smaller particulate sizes (e.g., as illustrated by comparing the results of Example 3 to Example 4).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    providing a treatment fluid that comprises a base fluid, a hydrophobically modified amine-containing polymer (HMAP), and a silane coupling agent, the HMAP comprising a plurality of hydrophobic modifications on a poly(vinyl imidazole);
    introducing the treatment fluid into a wellbore penetrating a subterranean formation, the subterranean formation comprising a plurality of particulates; and
    allowing the HMAP and the silane coupling agent to coat at least some of the particulates.

2. The method of claim 1, wherein the hydrophobic modification comprises a $C_4$-$C_{30}$ characterized by at least one selected from the group consisting of a straight chain, a branched chain, comprising an unsaturated C—C bond, comprising an aryl group, and any combination thereof.

3. The method of claim 1, wherein the particulates comprise at least one selected from the group consisting of formation fines, formation sand, a proppant, a gravel particulate, and any combination thereof.

4. The method of claim 1, wherein the HMAP is present in an amount ranging from about 0.01% to about 3% by weight of the aqueous base fluid.

5. The method of claim 1, wherein the treatment fluid further comprises a coupling agent in an amount ranging from about 0.001% to about 3% by weight of the HMAP.

6. The method of claim 1, wherein the treatment fluid is foamed.

7. The method of claim 1, wherein the treatment fluid further comprises at least one additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

8. The method of claim 1 further comprising introducing an acidizing fluid into the subterranean formation before introducing the treatment fluid.

9. A method comprising:
    mixing a treatment fluid that comprises a base fluid and a plurality of hydrophobically modified amine-containing polymer (HMAP) coated particulates that comprise an HMAP and a silane coupling agent coating at least a portion of a particulate, the HMAP comprising a plurality of hydrophobic modifications on a poly(vinyl imidazole); and
    introducing the treatment fluid into a wellbore penetrating a subterranean formation.

10. The method of claim 9, wherein the particulate comprises at least one selected from the group consisting of a proppant, a gravel particulate, and any combination thereof.

11. The method of claim 9, wherein the HMAP-coated particulates are present in an amount ranging from about 0.1 pounds per gallon to about 30 pounds per gallon of the treatment fluid.

12. The method of claim 9 further comprising:
    forming the HMAP-coated particulates by dry-coating the particulates with the HMAP before mixing the treatment fluid.

13. The method of claim 9 further comprising:
    introducing a pad fluid into the subterranean formation at a pressure sufficient to create or extend at least one fracture in the subterranean formation before introducing the treatment fluid.

* * * * *